US010900417B2

(12) United States Patent
Kraft et al.

(10) Patent No.: US 10,900,417 B2
(45) Date of Patent: Jan. 26, 2021

(54) GRID SCALE ENERGY STORAGE SYSTEMS USING THERMAL STORAGE COUPLED WITH GAS TURBINE AIR AND STEAM INJECTION

(71) Applicant: PowerPHASE LLC, Jupiter, FL (US)

(72) Inventors: Robert J. Kraft, Tequesta, FL (US); Steven Quisenberry, Stuart, FL (US); Scott Auerbach, Jupiter, FL (US)

(73) Assignee: PowerPHASE LLC, Jupiter, FL (US)

( * ) Notice: Subject to any disclaimer, the term of this patent is extended or adjusted under 35 U.S.C. 154(b) by 0 days.

(21) Appl. No.: 15/138,529

(22) Filed: Apr. 26, 2016

(65) Prior Publication Data

US 2016/0319746 A1  Nov. 3, 2016

Related U.S. Application Data

(60) Provisional application No. 62/154,885, filed on Apr. 30, 2015.

(51) Int. Cl.
*F02C 7/10* (2006.01)
*F02C 6/14* (2006.01)
*F02C 9/16* (2006.01)

(52) U.S. Cl.
CPC ............... *F02C 7/10* (2013.01); *F02C 6/14* (2013.01); *F02C 9/16* (2013.01)

(58) Field of Classification Search
CPC ...... F02C 7/08; F02C 7/10; F02C 6/14; F02C 6/16; F02C 6/18; F02C 9/16; F02C 9/28; F01K 23/06; F01K 23/10
USPC .................................................. 60/775, 39.15
See application file for complete search history.

(56) References Cited

U.S. PATENT DOCUMENTS

| | | | | |
|---|---|---|---|---|
| 4,094,148 A | | 6/1978 | Nelson | |
| 4,192,144 A | * | 3/1980 | Pierce | F01K 3/00 122/28 |
| 4,754,607 A | * | 7/1988 | Mackay | F02C 6/18 237/12.1 |
| 4,765,142 A | * | 8/1988 | Nakhamkin | F01K 21/047 60/652 |
| 7,086,231 B2 | * | 8/2006 | Pinkerton | F02C 1/05 60/650 |
| 2008/0238191 A1 | * | 10/2008 | Cottingham | H02J 9/06 307/9.1 |
| 2009/0277154 A1 | * | 11/2009 | Wood | F02C 7/10 60/39.511 |

(Continued)

FOREIGN PATENT DOCUMENTS

| | | | | |
|---|---|---|---|---|
| GB | 899255 | * | 12/1958 | F02C 1/06 |
| GB | 899255 | | 6/1962 | |

(Continued)

OTHER PUBLICATIONS

International Search Report with Written Opinion corresponding to International Patent Application No. PCT/US2016/029304, dated Aug. 29, 2016.

*Primary Examiner* — Jesse S Bogue
*Assistant Examiner* — Loren C Edwards
(74) *Attorney, Agent, or Firm* — Avant Law Group, LLC

(57) ABSTRACT

The invention relates generally to an electrical power and storage system and more specifically to ways and methods of using a thermal storage medium as a heat source to heat compressed air from a power augmentation system for use in a gas turbine engine.

9 Claims, 6 Drawing Sheets

(56) References Cited

U.S. PATENT DOCUMENTS

| | | | | |
|---|---|---|---|---|
| 2011/0259007 A1* | 10/2011 | Aoyama | ................... | F02C 1/05 |
| | | | | 60/641.14 |
| 2014/0102073 A1* | 4/2014 | Pang | ........................ | F01K 3/00 |
| | | | | 60/39.182 |
| 2014/0202157 A1 | 7/2014 | Shinnar et al. | | |
| 2014/0250902 A1 | 9/2014 | Kraft | | |

FOREIGN PATENT DOCUMENTS

| | | | | |
|---|---|---|---|---|
| WO | WO2013151909 | * 10/2013 | ................ | F02C 6/16 |
| WO | WO-2014055717 A1 * | 4/2014 | ................ | F02C 7/10 |

\* cited by examiner

GRID SCALE ENERGY STORAGE SYSTEMS USING THERMAL STORAGE COUPLED WITH GAS TURBINE AIR AND STEAM INJECTION

CROSS-REFERENCE TO RELATED APPLICATIONS

This application claims priority to U.S. Patent Application Ser. No. 62/154,885 filed on Apr. 30, 2015, which is incorporated by reference herein in its entirety.

TECHNICAL FIELD

The invention relates generally to electrical power systems and energy storage, including generating capacity of a gas turbine, and more specifically to methods of integrating compressed air and thermal energy storage to provide energy storage at a gas turbine power plant.

BACKGROUND OF THE INVENTION

As the renewable energy penetration increases, there is a dynamic balancing act that takes place every day between load, renewable power and conventional generation. For example, in the California energy market, the amount of solar energy is significantly changing the dispatch of conventional power generation. During the mid-day, when load peaks, solar power is also at its peak and suppresses the generation required during the peak load period. Consequently, there is a need to shift the power output from conventional generation to the morning and evening time, and reduce power, or shut off, during mid-day. Today, there is no energy storage system that can shift the power output of conventional gas turbine power plant (at the plant) from off-peak to on-peak. There are a variety of smaller scale systems, including batteries and demand response systems that effectively help solve the challenge, however, today these systems are relatively small in nature and in many cases very expensive, multiple times the cost of conventional gas turbine power generation. There are larger compressed air energy storage systems, however, they need underground storage and are a siting challenge. Demand response systems along with some forms of energy storage are "behind the meter" solutions, or are controlled by the source of the electrical load. Batteries and other grid storage technologies are "in front of the meter" and are controlled by the grid or the power generator. Behind the meter solutions are very effective from a transmission standpoint, because they are located at the source of the load and directly reduce the transmission requirement when the system is deployed. In front of the meter solutions, like batteries, have to be sited, and are optimally sited at a transmission constraint, however, this is space constraint limited some times. Both in front of and behind the meter storage solutions involve an electrical tie in including circuit protection and breakers, which can be a significant part of the cost of the installation of the equipment. Additionally, in the case of storage systems, the round trip efficiency is always less than 100%, so there is some energy wasted that is not recovered in the process.

SUMMARY

The present invention addresses the shortfalls in the prior art and is a gas turbine engine with air or steam injection where the air and/or steam is generated real time and the thermal energy needed to heat the air and/or steam for injection comes from a stored thermal system. The present invention is installed on a new or existing simple or combined cycle gas turbine power plant thereby addressing the optimal siting challenge because the power plant is already strategically located. Also, since the gas turbine engine power plant is already tied to the grid, minimal electrical systems are required to be added which keeps installation and operational costs low. Since the air is generated real time, there is no need for underground storage, thereby reducing the foot print, complexity and the cost. The thermal storage system that is used to heat up the air can be a variety of medias including liquid-based systems, such as molten salt, oils, or other fluids and solid based systems, such as graphite.

The real time compressor, which in an embodiment of the present invention, is a multi-stage intercooled compressor, results in pressurized air at approximately 220 deg. F. The compressor can be driven electrically which outputs some of the incremental power made on the gas turbine engine but has the advantage that it is not a new source of emissions at the power plant. The compressor can be driven with a fueled engine. This arrangement provides a further advantage in that when the thermal storage system is low on thermal energy, the waste heat from the fueled engine can be used to elevate the temperature of the compressed air. The fueled engine driven compressor also has two other benefits. First, when the thermal storage is completely depleted, the waste heat from the fueled engine can be used continuously to generate hot air for injection into the gas turbine engine. Second, the fueled engine can be used to run a conventional generator when the gas turbine engine is not running.

Hot air, approximately the temperature of the gas turbine engine compressor discharge temperature (approximately 750 deg. F. for a F-class gas turbine engine) is a requirement for air being injected into the compressor discharge plenum. Injecting hot air takes full advantage of a major set of systems already installed, thereby keeping costs low. More power is produced than consumed because fuel is added to the cycle in the gas turbine engine, resulting in more power generated than consumed.

The thermal storage system can be charged with electrical power or steam from the gas turbine engine power plant when power demands are low. When additional power is required, the thermal storage system is used to heat the air to the appropriate temperature for injection. The thermal storage system can include a bypass system to maintain a desired temperature range for air injection or, in the case of a liquid medium thermal storage system, the flow rate of the liquid can be adjusted to maintain the desired temperature range for air injection.

The present invention relates to systems and methods for providing compressed air to a gas turbine engine in order to increase the output of a gas turbine engine. In an embodiment of the present invention, a system is disclosed for providing compressed air to a gas turbine engine having a power augmentation system and a thermal storage system. The power augmentation system has a fueled engine coupled to an auxiliary compressor and a recuperator. The thermal storage system has an inlet coupled to the power augmentation system, a heat exchange system for receiving heat from a stored thermal energy source and directs the heat to compressed air from the power augmentation system, and an outlet coupled to the gas turbine engine.

In an alternate embodiment of the present invention, a method of operating a compressed air and thermal energy storage system at a gas turbine power plant is disclosed comprising operating a multistage compressor from a fueled engine to generate a supply of compressed air, providing a thermal storage medium, heating the supply of compressed air with heat from the thermal storage medium, and, injecting the compressed air into the gas turbine.

In another embodiment of the present invention, a method of operating a compressed air and thermal energy storage system at a gas turbine power plant is disclosed comprising generating a supply of compressed air from a multistage compressor, heating the supply of compressed air with waste heat from a fueled engine, heating the supply compressed of compressed air with heat from a thermal storage medium, and, injecting the supply of compressed air into the gas turbine engine.

In yet another embodiment of the present invention, a compressed air and thermal energy storage system is provided comprising a multistage compressor driven by a fueled engine, a liquid thermal storage medium, a heat exchanger for transferring heat from the liquid thermal storage medium to the compressed air, where the compressed air generated in the multistage compressor is heated with the liquid thermal storage medium and then injected into a gas turbine.

In another embodiment of the present invention, a compressed air and thermal energy storage system is disclosed comprising a multistage compressor driven by a fueled engine, a solid thermal storage medium, and a heat exchanger for transferring heat from the solid thermal storage medium to the compressed air, where the compressed air generated in the multistage compressor is heated with the solid thermal storage medium and then injected into a gas turbine.

In yet a different embodiment of the present invention, a method of operating a compressed air and thermal energy storage system at a gas turbine power plant comprises operating an electrically driven multistage compressor to generate a source of compressed air, providing a thermal storage medium, heating the compressed air with energy from the thermal storage medium, and injecting the compressed air into the gas turbine.

In another embodiment of the present invention, a method of operating a compressed air and thermal energy storage system at a gas turbine power plant comprises operating a steam driven multi-stage compressor to generate a source of compressed air, providing a thermal storage medium, heating the compressed air with stored thermal energy, and, injecting the compressed air into the gas turbine.

Another aspect of the present invention is providing a method of operating a compressed air and thermal energy storage system at a gas turbine power plant comprising operating a steam driven multi-stage compressor to generate a source of compressed air, providing a thermal storage medium, heating the compressed air with stored thermal energy, and injecting the compressed air into the gas turbine.

Yet another aspect of the present invention provides a method of operating a compressed air and thermal energy storage system at a gas turbine power plant comprising operating a steam driven multi-stage compressor to generate a source of compressed air, providing a liquid thermal storage medium and a heat exchanger for transferring heat energy from the liquid thermal storage medium to the compressed air, heating the compressed air with energy from the liquid thermal storage medium, and injecting the compressed air into the gas turbine.

In another embodiment of the present invention, a method of operating a compressed air and thermal energy storage system at a gas turbine power plant is provided comprising operating a steam driven multi-stage compressor to generate a source of compressed air, providing a liquid thermal storage medium and a heat exchanger for transferring heat energy from the liquid thermal storage medium to the compressed air, heating the compressed air with energy from the liquid thermal storage medium, and injecting the compressed air into the gas turbine.

Yet another aspect of the present invention relates to a method of operating a steam injection and thermal energy storage system at a gas turbine power plant comprising providing a steam supply and a heat exchanger, the heat exchanger in fluid communication with a thermal storage system, directing the steam supply through the heat exchanger, heating the steam supply with energy from the thermal storage system, and, injecting the steam supply into the gas turbine.

Other advantages, features and characteristics of the present invention, as well as the methods of operation and the functions of the related elements of the structure and the combination of parts will become more apparent upon consideration of the following detailed description and appended claims with reference to the accompanying drawings, all of which form a part of this specification.

BRIEF DESCRIPTION OF THE SEVERAL VIEWS OF THE DRAWINGS

The present invention is described in detail below with reference to the attached drawing figures, wherein.

DETAILED DESCRIPTION

The present invention relates to methods and system of compressing air, heating air and/or steam with various mediums including thermal storage, and injecting hot air and/or steam into a gas turbine, where the air compressor is driven by a separately fueled engine or steam.

The present invention has multiple basic operating modes as well as hybrid modes that are a combination of the individual modes. For example, with respect to use of a molten material, such as molten salt, there are four modes to monitor. In Mode 1, Energy storage—thermal energy is stored as liquid molten salt with electrical resistive heaters and in Mode 2, a fuel driven compressor generates air that is heated with the molten salt thermal storage system and injected into the gas turbine engine for power generation. Mode 3 occurs when the molten salt is low on thermal energy or out, and the exhaust heat from the fueled engine is used to heat the air for injection into the gas turbine engine for continuous power generation, and Mode 4 occurs when the gas turbine engine is not operational, and the fueled engine can drive a generator for power generation.

Figure 1:
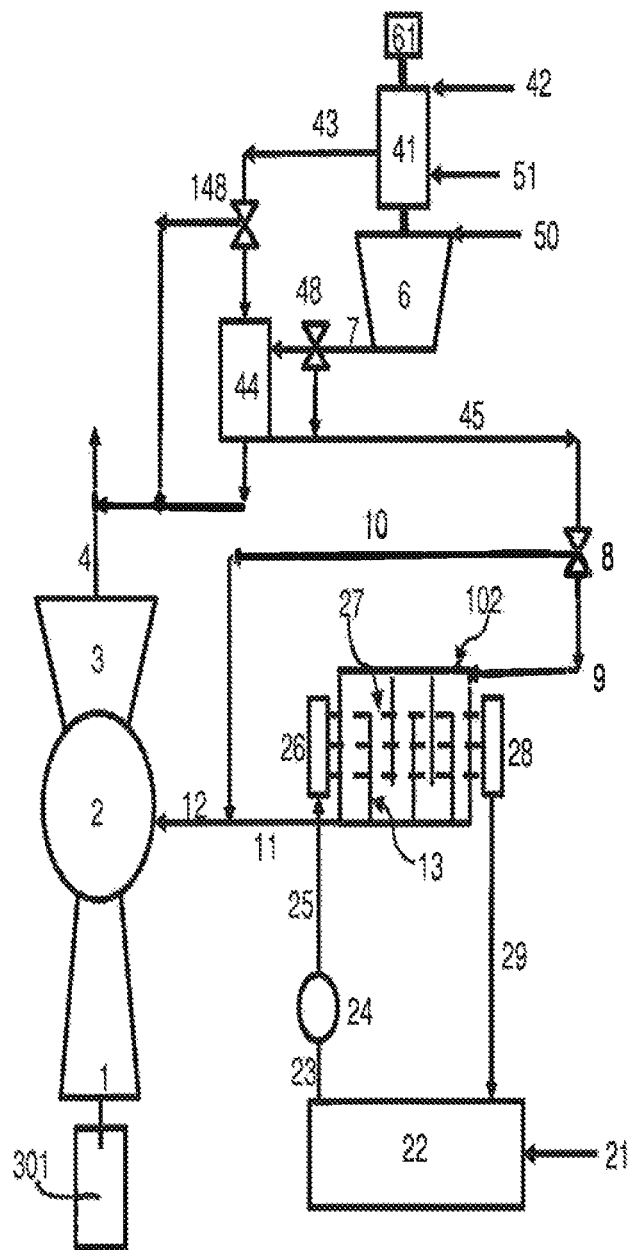
FIG. 1 is a schematic drawing of an embodiment of the present invention having a fueled engine driven compressor and a liquid storage system.

An embodiment of the present invention is shown in FIG. 1. Hot, pressurized air 12 is injected into a gas turbine system comprising of a compressor 1, a combustion chamber 2 and a turbine 3. The gas turbine system is mechanically coupled to a generator 301 and exhausts hot gasses 4. The hot pressurized air 12 is first generated in the multistage air compressor 6 and then heated in a recuperator 44 and/or a thermal storage system 102. The multistage compressor 6 is driven by a fueled engine 41 which takes in fuel 51 and air 42 and produces shaft power to drive the multistage compressor 6 and/or a generator 61 and exhausts hot gasses 43. These hot exhaust gasses 43 enter the recuperator 44 where the compressed air 7 from the multistage air compressor 6 can be selectively heated. This heating occurs by controlling the compressor discharge bypass valve 48 in order to heat up the compressed air 7 a variable amount, depending on the desired output temperature of the compressed air. Alternately, the hot exhaust gasses 43 can bypass the recuperator 44 by selectively adjusting the exhaust bypass valve 148. In both cases, the exhaust temperature after the recuperator 44 (in the case of the compressed air bypass valve 48 and the exhaust after the recuperator in the case of the exhaust bypass system 148) is reduced proportionally given to the amount of heat that is transferred to the compressed air 45 exiting the recuperator 44. The amount of heat transferred to the compressed air can vary from zero to nearly all of the exhaust energy. In general, the amount of heat added is dictated by the desired temperature of the air injection 12 and the amount of heat that can be transferred to the compressed air in the thermal storage system 102.

One such embodiment of the thermal storage system 102 is a molten salt system. However, other forms of thermal storage are possible. In the present embodiment, electrical energy 21 is used to heat up the salt during the storage process and the hot molten salt is stored in an insulated tank 22. Molten salt is preferable because it is inexpensive, non-toxic, and it is an effective heat transfer medium. During the power generation mode, the hot molten salt is drawn from the tank 22 through a pipe 23 and then increased in pressure by a pump 24 that can operate at variable flow rates depending on the amount of thermal energy desired to be transferred to the air. The hot molten salt exits the pump 24 through pipe 25 and enters a manifold 26 where the molten salt is directed through tubes 27 and then recollected after the heat exchange process in the exit manifold 28 and returned to the tank 22 through a return pipe 29. Alternately, two tanks can be used, one hot and one cold so that the molten salt temperature does not drop when the cooler molten salt returns from the heat exchanger.

On the air side, the temperature of the warm air 45 is controlled depending on how much thermal capacity is left in the thermal storage system with either the exhaust bypass valve 148 or the air bypass valve 48. A variable amount of warm air 45 is directed towards the thermal storage system 102 by controlling the warm air bypass valve 8. The warm air 45 that is directed to the thermal storage system 102 enters the counter flow heat exchanger 9, flows around baffles 13 and over the tubes 27 in the heat exchanger 9 and exits the heat exchanger at an elevated temperature. This air 11 is combined with the air 10 that bypasses the thermal storage system to provide the hot pressurized air 12 which is injected into the gas turbine engine to produce additional power. As one skilled in the art can appreciate, air injection temperature is a function of the air injection location. For example, if air is being injected into the compressor discharge case on a General Electric 7FA gas turbine engine, it is preferred that the air temperature be approximately 500 deg. F. to 750 deg. F. If air is injected into a lower pressure, lower temperature circuit, such as the intermediate pressure cooling circuit, much lower temperature air is needed. By having the option of combining the waste heat from the fuel driven engine 41 driving the compressor 6, the option of bypassing the thermal storage, partially or completely, yields a very flexible system that results in all injection options being available independent of the state of charge of the thermal storage system 102.

In another embodiment, the order adding the storage heat to the air is reversed to occur before the recuperator, such that the thermal storage system pre-heats the air and then goes through the recuperator with the exhaust or air bypass, putting the final heat into the system to achieve the desired injection temperature. As one skilled in the art can appreciate, many engine models, both industrial and aero-derivative type, have existing manifolds and/or ports into the compressor discharge case, which are a convenient location to add compressed air to the gas turbine compressor discharge area.

In terms of increased performance obtained from the present invention, approximately 6 MW of additional power is generated on a F-class combined cycle class gas turbine engine (5 MW from the gas turbine engine+1 MW from the steam turbine) with a 2 MW gas-fueled engine 41 driving the multi-stage compressor 6. Approximately 4 MW of thermal energy is consumed to heat the compressed air from 220 deg. F. (9) to 750 deg. F. (12) and the waste heat 43 from the gas fueled engine 41 is approximately 1000 deg. F. Therefore, during the storage process, approximately 4 MW of power is consumed for 4 hours, and 6 MW is produced for 6 hours. This is a 150% return in terms of energy out to energy in. To increase the number of hours of discharge, the thermal tank size 22 can be increased.

Figure 2:
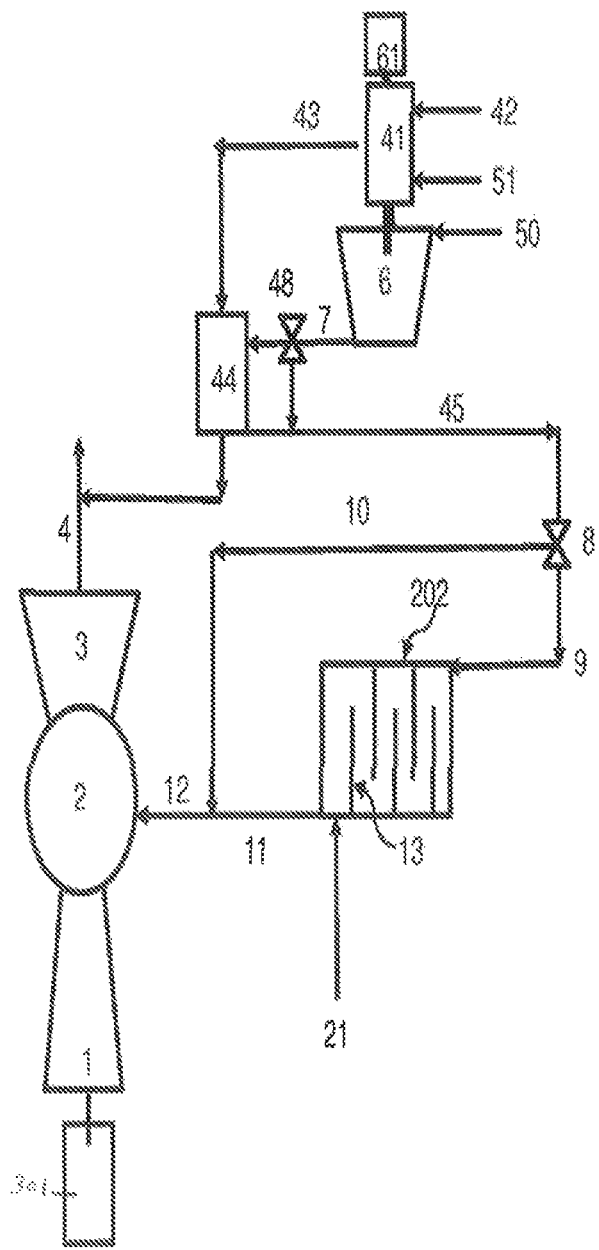
FIG. 2 is a schematic drawing of an embodiment of the present invention having a fueled engine driven compressor and a solid storage system.

Referring now to FIG. 2, an alternate embodiment of the thermal storage system 202 is depicted. In this embodiment, the thermal storage system 202 is a solid medium, such as graphite, and can be thermally charged with electricity 21. Air 9 is directed to the thermal storage system 202 from the bypass valve 8 and flows through the heat exchange process, typically through air pipes, and exits 11 the heat exchanger hotter than when it enters. Other features of the embodiment of FIG. 2 are similar to those discussed above with respect to FIG. 1. In terms of increased performance obtained, approximately 6 MW of incremental power is generated on a F-class combined cycle gas turbine (5 MW from the gas turbine engine+1 MW from the steam turbine) with a 2 MW gas-fueled engine 41 driving the multi-stage compressor 6, approximately 4 MW of thermal energy, such as electricity 21, is consumed to heat the compressed air from approximately 220 deg. F. (9) to approximately 750 deg. F. (12) and the waste heat 43 from the gas fueled engine 41 is approximately 1000 deg. F. Therefore, during the storage process, 4 MW of power is consumed for 4 hours, and 6 MW is produced for 6 hours, yielding approximately a 150% return when considering energy out/energy in. To increase the number of hours of discharge, the thermal block size can be increased.

Figure 3:
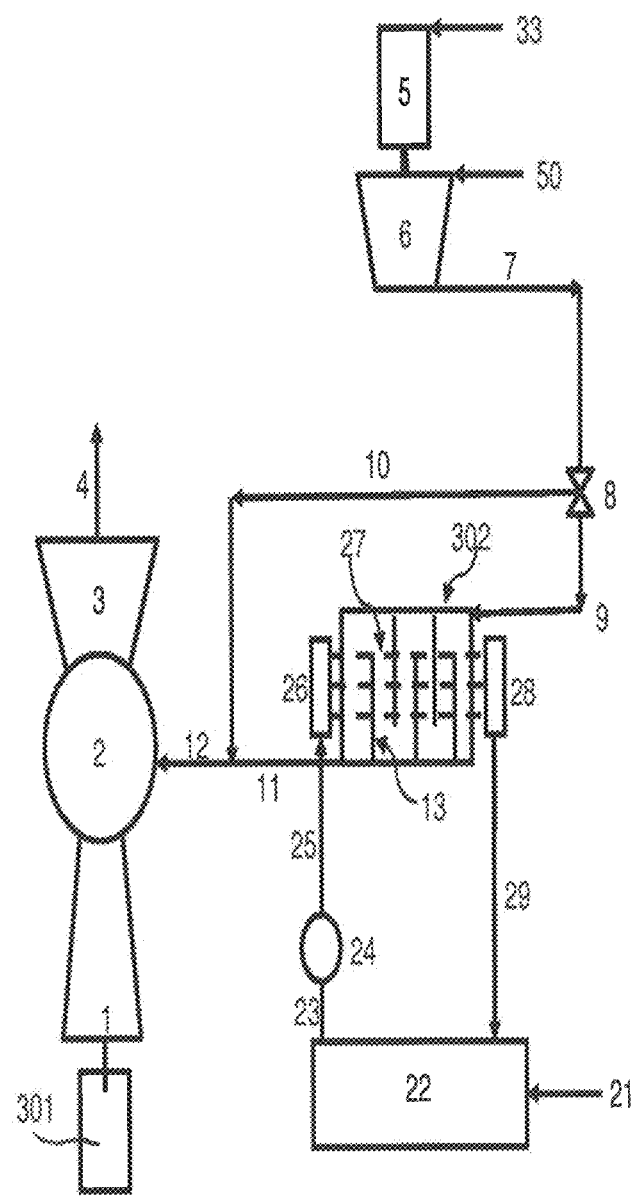
FIG. 3 is a schematic drawing of an embodiment of the present invention having an electrically driven compressor and a liquid storage system.

FIG. 3 shows a similar embodiment to the thermal storage system of FIG. 1. However, the thermal storage system 302 is used in conjunction with an electrically driven compressor. An electrical motor 5 takes in electricity 33 and drives the multi-stage compressor 6. The compressor 6 compresses ambient air 50 to approximately 250 psi and 220 deg. F. This compressed air is hot enough to inject into some circuits of a gas turbine engine, such as the rotor air cooling circuit on a Siemens-Westinghouse 501-series engine or the intermediate or low pressure cooling circuits that feed cooling air to later stages of a gas turbine engine. Therefore, this gives the electrically driven system an option for injection into the gas turbine engine when the thermal storage is depleted, or a continuous mode. These low temperature injection locations may not be the best place to inject the air, so when the thermal storage system 302 is charged, the air can be elevated in temperature similar to that discussed with respect to FIG. 1, producing hot pressurized air 12 for air injection. In terms of anticipated performance improvements, it is believed that an additional 5.5 MW of incremental power is generated on an F-class combined cycle gas turbine (5 MW from the gas turbine engine+0.5 MW from the steam turbine) with a 2 MW electric motor 5 driving the multi-stage compressor 6. Approximately 4 MW of thermal energy 21 is consumed to heat up the compressed air from 220 deg. F. (9) to 750 deg. F. (12). Therefore, during the storage process, 4 MW of power is consumed for 4 hours, and 5.5 MW gross power, 3.5 MW net power, is produced for 6 hours. This is an 88% return when considering energy out/energy in.

Figure 4:
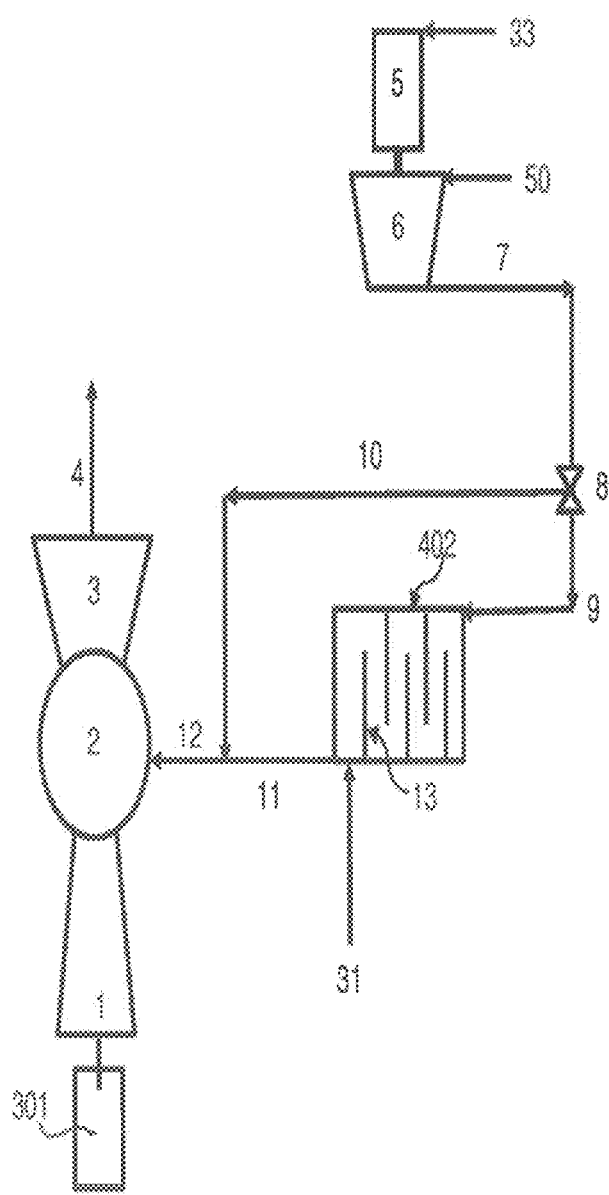
FIG. 4 is a schematic drawing of an embodiment of the present invention having an electrically driven compressor and a solid storage system.

FIG. 4 shows a similar embodiment of the thermal storage system described above with an electrically driven compressor, but the thermal storage system 402 utilizes a solid medium as its thermal storage. An electrical motor 5 takes in electricity 33 and drives the multistage air compressor 6. The compressor 6 compresses ambient air 50 to approximately 250 psi and 220 deg. F. Similar to the molten salt embodiment discussed above, when the thermal storage is depleted, a continuous mode of lower temperature air injection is possible. When the thermal storage system 402 is charged, the air can be elevated in temperature similar to the embodiment in FIG. 1, producing heated air 12 for air injection. In terms of anticipated performance improvements, approximately 5.5 MW of incremental power is generated on a F-class combined cycle gas turbine (5 MW from the gas turbine engine+0.5 MW from the steam turbine). A 2 MW electric motor 5 drives the air compressor 6 and approximately 4 MW of thermal energy 31 is consumed to heat up the compressed air from 220 deg. F. (9) to 750 deg. F. (12). Therefore, during the storage process 4 MW of power is consumed for 4 hours, and 5.5 MW gross, 3.5 MW net, is produced for 6 hours. This is an 88% return when considering energy out/energy in.

Figure 5:
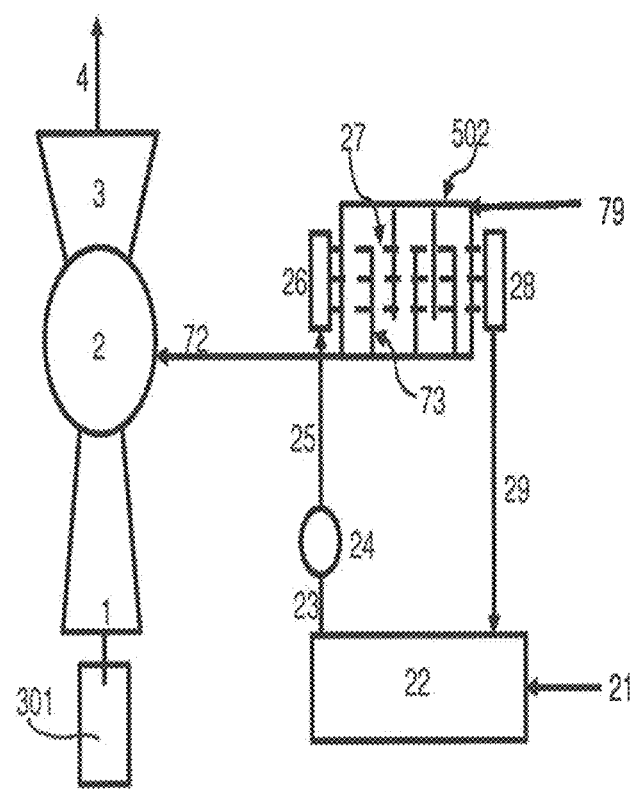
FIG. 5 is a schematic drawing of an embodiment of the present invention having a fueled engine driven compressor and a liquid storage system.

FIG. 5 shows a similar embodiment to the molten salt thermal storage system of FIG. 1, however, the thermal storage system 502 is utilized in conjunction with a gas turbine steam injection system. The thermal storage system 502 is used to add energy to incoming water 79 where this incoming water 79 can be 100% water, saturated water, saturated steam or superheated steam. The added energy increases the energy level of the water such that it exits the thermal storage system 502 in a superheated condition 72 and is injected into the gas turbine engine for power augmentation. For example, on a F-class combined cycle power plant, 10 lb/sec (36 kpph) of saturated water can be taken from the Heat Recovery Steam Generator (HRSG) intermediate pressure section (400 psi, 448 deg. F., h=428 BTU/lb) and 8.9 MW of energy can be added to convert the water to superheated steam (400 psi, 550 F, h=1275 BT/lb) increasing the enthalpy of the stream by 847 BTU/lb. When 10 lb/sec of 550 deg. F. steam is taken from the combined cycle gas turbine engine and injected into the gas turbine engine at these conditions, the gas turbine engine power increases 6.2 MW and the steam turbine loses 1.5 MW, because of the flow extraction. Therefore, with the steam system, 8.9 MW is stored (per hour) and 4.7 MW (net) is produced. This is a 53% return when considering energy out to energy in. This net power gain is lower than alternate embodiments discussed above because at times the steam (8.9 MW) is used to heat the thermal storage system when the power plant is trying to reduce power output in general. This principal can be extended, by adding more thermal storage, to further reduce the power output of the plant. The thermal storage also can be used as high speed regulation, where the 8.9 MW power input can vary over time to optimize the power output of the plant to meet changing grid power requirements.

Additionally, with an appropriately sized thermal storage system 502, ambient condition water can be pressurized and introduced to the thermal storage system 502 and converted into steam and injected into the gas turbine engine. By doing this, the steam extraction to heat the thermal storage system 502 can be used to 1) reduce power output of the plant during times of low power demand, 2) improve the plant efficiency during time of moderate power demand, and 3) increase the plant output and efficiency during periods of high power demand.

Figure 6:
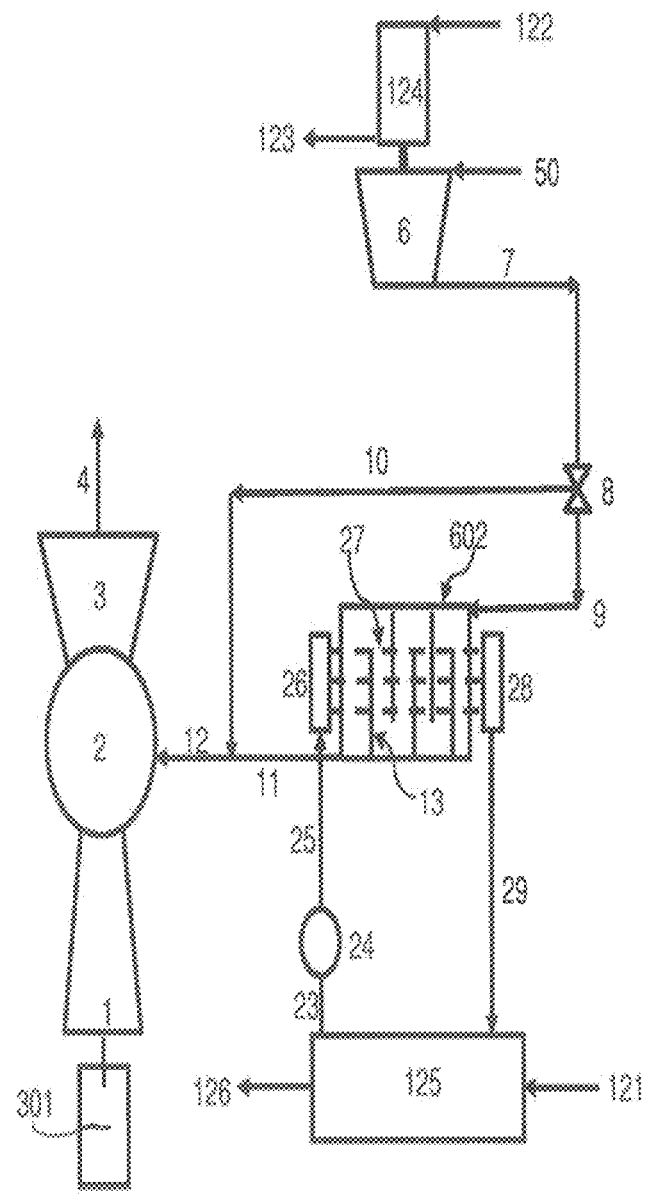
FIG. 6 is a schematic drawing of an embodiment of the present invention having a steam driven compressor and a liquid storage system.

FIG. 6 shows a similar embodiment of the molten salt thermal storage of FIG. 1, but also includes a gas turbine air injection system where the air compressor 6 is driven by steam. For example, a 2 MW steam turbine 124 is driven by steam 122 that comes from a heat recovery steam generator (HRSG) (not shown), where the steam is returned 123 to the steam cycle of the plant. The multi-stage compressor 6, compresses ambient air 50, and delivers it to the thermal storage system 602, in this case molten salt. However, instead of the molten salt being heated with electrical resistive heating, it is heated with steam 121 in the thermal storage device 125. Again, the steam is returned to the plant steam cycle 126 after energy is extracted from it in the thermal storage device 125. The flow rate of the incoming steam 121 can be varied to produce optimal thermal storage results. For example, on an F-class combined cycle power plant, 4 MW of energy (4739 BTU/sec) is used for the thermal storage system 602 when power demand is low. Then, when power demand increases, 2 MW worth of steam from the gas turbine engine steam cycle can be used to drive a 2 MW air compressor, the air of which is heated in the thermal storage system 602 and then injected into the gas turbine engine, producing 5 MW of power in the gas turbine engine and a net 1.5 MW loss in the gas turbine engine's steam turbine (−2 from the extraction and +0.5 from the air injection) for a net 3.5 MW of additional power output. This is a 88% return (energy out/energy in). Since the steam is available when the combined cycle gas turbine engine plant is running, the system can run continuously and a separate steam heater can be added to increase the temperature of the air injection to a minimum of 500 deg. F. with 843 BTU/sec input energy from the steam cycle, which would result in an additional drop in power output from the gas turbine engine's steam turbine. Alternately, cooler air can be injected into the gas turbine in some other location as previously discussed.

While the invention has been described in what is known as presently the preferred embodiment, it is to be understood that the invention is not to be limited to the disclosed embodiment but, on the contrary, is intended to cover various modifications and equivalent arrangements within the scope of the following claims. The present invention has been described in relation to particular embodiments, which are intended in all respects to be illustrative rather than restrictive.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

The invention claimed is:

1. A method of operating a compressed air and thermal energy storage system at a gas turbine power plant, the gas turbine power plant including a gas turbine engine comprising a compressor, a combustor, and a turbine, the method comprising:
    operating a multistage auxiliary compressor by way of a fueled engine situated upstream of the gas turbine engine to generate a supply of compressed air;
    heating the supply of compressed air in a recuperator with exhaust of the fueled engine to form a heated supply of compressed air;
    providing a thermal storage medium downstream of the recuperator, the thermal storage medium configured to be repeatedly thermally chargeable and dischargeable;
    providing a pathway; the pathway configured to allow for the heated supply of compressed air to selectively bypass the thermal storage medium to form bypassed air;
    thermally charging the thermal storage medium and heating at least a portion of the heated supply of compressed air with heat from the thermal storage medium to form thermal storage air; and,
    injecting injection air into the gas turbine engine upstream of the combustor while the gas turbine engine is operational, the injection air comprising the thermal storage air and any bypassed air;
    wherein the pathway is further configured to allow parts of each of the exhaust of the fueled engine and the supply of compressed air to selectively bypass the recuperator.

2. The method of claim 1, wherein the fueled engine also drives a generator to generate electrical power.

3. The method of claim 1, wherein a heating input to the thermal storage medium is electricity.

4. The method of claim 1, wherein the heat to charge the thermal storage medium is steam from the gas turbine power plant.

5. The method of claim 1, wherein the pathway is further configured to allow a part of at least one of the exhaust of the fueled engine and the supply of compressed air to selectively bypass the recuperator.

6. A method of operating a compressed air and thermal energy storage system at a gas turbine power plant, the gas turbine power plant comprising a compressor, a combustor, and turbine, the method comprising:
    operating a multistage auxiliary compressor by way of a fueled engine to generate a supply of compressed air;
    using a recuperator to heat the supply of compressed air with exhaust of the fueled engine to form heated recuperator air;
    providing a thermal storage medium directly downstream of the recuperator, the thermal storage medium configured to be repeatedly thermally chargeable and dischargeable;
    configuring the thermal storage medium to heat the heated recuperator air received directly from the recuperator to form thermal storage air;
    providing a selectable bypass path to allow for the heated recuperator air to selectively bypass the thermal storage medium;
    using the selectable bypass path to cause at least a portion of the heated recuperator air to bypass the thermal storage medium to form bypass air;
    injecting injection air into a gas turbine engine upstream of the combustor while the gas turbine engine is operational, the injection air comprising the bypass air and any thermal storage air.

7. The method of claim 6, wherein the thermal storage medium comprises a tank and a pump.

8. The method of claim 6, wherein the thermal storage medium is stored at a first location and is thermally charged at a second location disparate from the first location.

9. A method of operating a compressed air and thermal energy storage system at a gas turbine power plant comprising:
    operating a multistage auxiliary compressor by way of a fueled engine to generate a supply of compressed air;
    heating at least a portion of the supply of compressed air in a recuperator with exhaust of the fueled engine to form a heated supply of compressed air;
    providing a thermal storage medium directly downstream of the recuperator, the thermal storage medium configured to be repeatedly thermally chargeable and dischargeable;
    providing a pathway; the pathway configured to allow for the heated supply of compressed air to selectively bypass the thermal storage medium to form bypassed air;
    thermally charging the thermal storage medium and heating at least a portion of the heated supply of compressed air received directly from the recuperator with heat from the thermal storage medium to form thermal storage air; and,
    injecting injection air into a gas turbine engine while the gas turbine engine is operational, the injection air comprising the thermal storage air and any bypassed air;
    wherein, a compressor discharge bypass valve is usable to selectively cause at least a part of the supply of compressed air to bypass the recuperator.

* * * * *